(Model.)
2 Sheets—Sheet 2.
J. T. JOHNSON.
CHECK ROW PLANTER.
No. 248,325.
Patented Oct. 18, 1881.
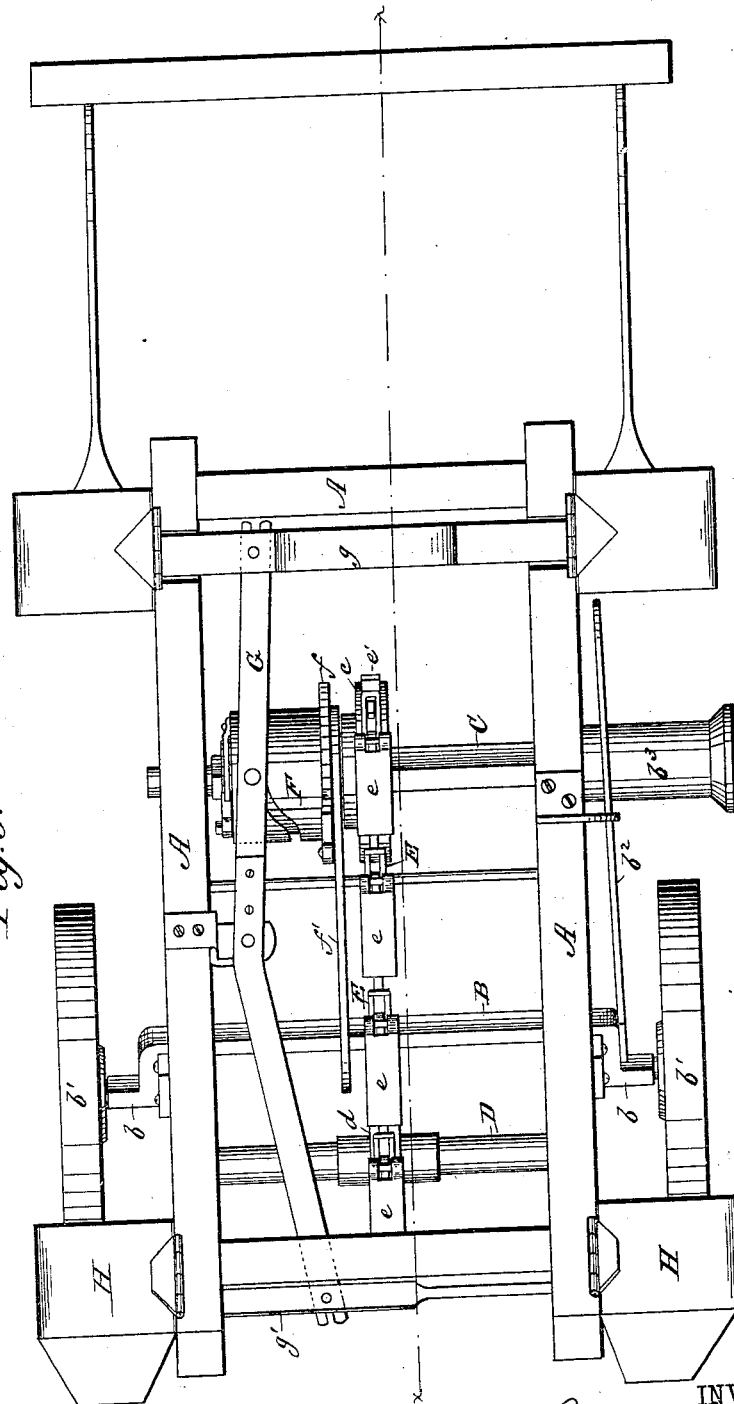
WITNESSES:
W. W. Hollingsworth
A. G. Lyne
INVENTOR:
John T. Johnson
BY
ATTORNEYS.

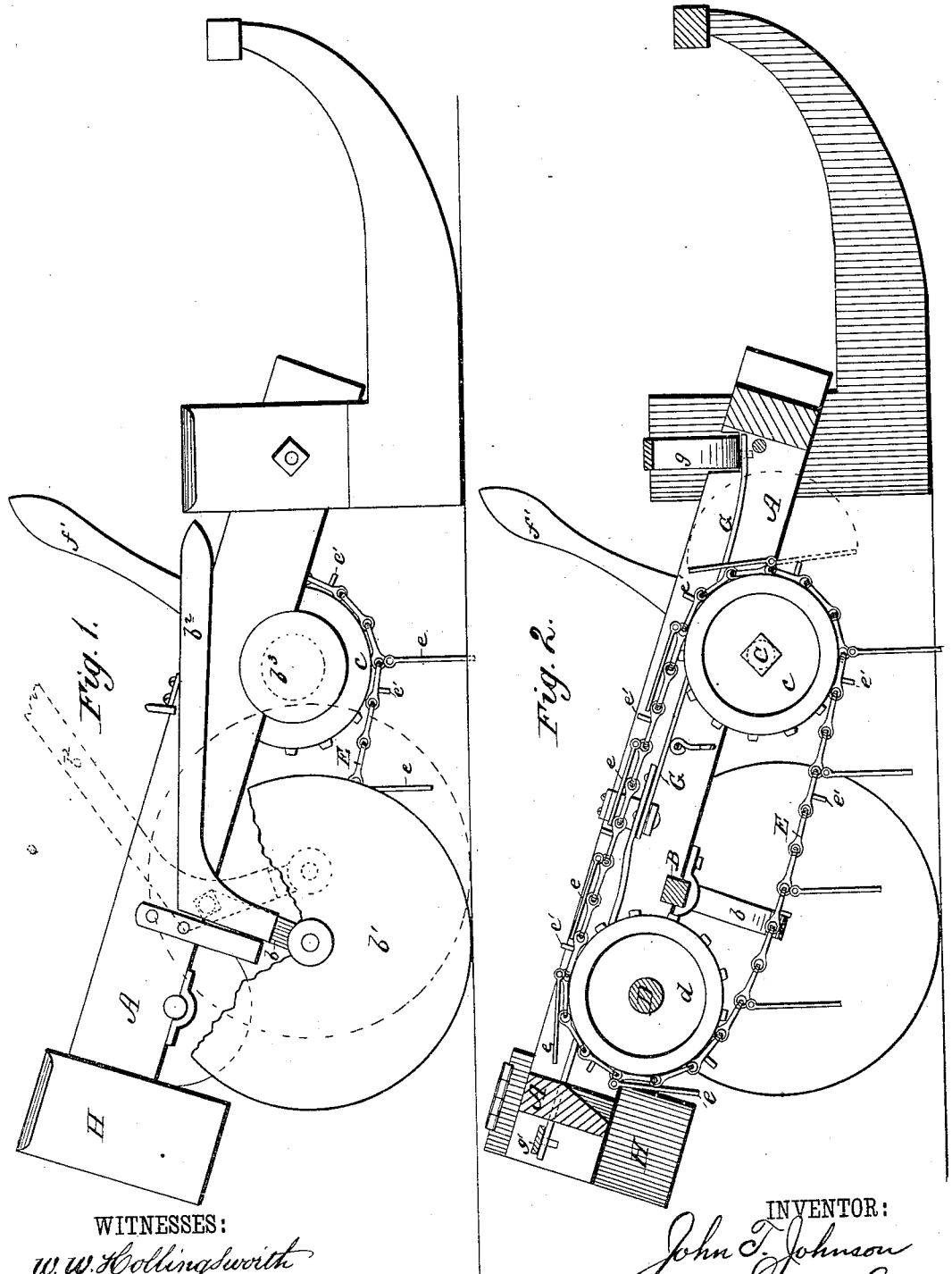

UNITED STATES PATENT OFFICE.

JOHN T. JOHNSON, OF SEEHORN, ILLINOIS.

CHECK-ROW PLANTER.

SPECIFICATION forming part of Letters Patent No. 248,325, dated October 18, 1881.

Application filed January 31, 1881. (Model.)

*To all whom it may concern:*

Be it known that I, JOHN T. JOHNSON, a citizen of the United States, residing at Seehorn, in the county of Adams and State of Illinois, have invented a new and useful Check-Row Planter, of which the following is a full, clear, and exact description, reference being had to the drawings hereto annexed.

My invention relates to check-row seed-planters; and it consists in a forwardly-inclined frame provided with two sprockets and an endless chain having pivoted spades, which are to be thrust into the ground by the weight and movement of the planter, as and for the purpose hereinafter described.

In the accompanying drawings, Figure 1 is a side elevation of my invention with one of the wheels partly broken away; Fig. 2, a sectional view taken on the line $x\ x$ of Fig. 3, and Fig. 3 a plan view.

A represents the frame of the planter, supported to the rear of its center upon the axle B, having crank-shaped ends $b$, with the cranks turned downward, wheels $b'$, and adjusting-lever $b^2$, whereby the wheels may be thrown forward to balance the frame, in order that the runners and spades may be more easily lifted from the ground in turning the planter around.

To each or either outer end of revolving shaft C, which is journaled to sides of frame at its forward and lower end, is attached a fixed spool or roller, $b^3$, against which the wheel rests for support when thrown forward. Upon said revolving shaft C, near its center, is rigidly secured a sprocket-wheel, $c$, which operates in conjunction with another sprocket-wheel, $d$, secured in like manner upon a revolving shaft, D, journaled to the sides of frame at its rear end by means of the endless chain E, having a series of flexible spades, $e$, pivoted upon its outer side or periphery at suitable intervals, in such manner that their free vibrating ends will come in contact with the ground as they fall forward over the foremost sprocket-wheel, and as said sprocket-wheel is near the ground the weight and forward motion of the planter will cause the said spades to be thrust into the ground, thereby giving the desired motion to the sprocket-wheels. For the better accomplishment of this object each spade is provided with a guide, $e'$, attached to the chain, whereby the spade will be held in the proper position for being thrust into the ground as it comes under the foremost sprocket-wheel. Thus the distance between the hills of corn is accurately indicated by the depressions left in the ground, and may be varied by substituting wheels of different sizes.

It will be readily seen that continuous motion will thus be given to the cam F upon the shaft C. Said cam is provided with a ratchet-wheel, $f$, and adjusting pawl-lever $f'$, whereby the cam may be turned forward to any desired position, for the purpose of placing the machine in check-row at the turning-point of the field or to remedy any imperfect check-rowing at the moment of its occurrence.

The cam F operates in conjunction with the shifting-lever G, pivoted near its center to one side of frame A, and having horizontal drop-slides $g$ and $g'$ pivoted to its ends. The rear slide-bar, $g'$, is connected at its ends with the boxes H H at the rear of the planter, which are designed for holding pulverized lime or any other suitable substance, and is set or arranged so as to drop the latter upon each hill as it passes over it, which lime, by its whiteness, indicates or marks the position of the planted corn.

Having thus fully described my invention, what I claim as new, and desire to secure by Letters Patent, is—

In a check-row planter, the endless chain E, having pivoted spades $e$ and guides $e'$, for holding said spades in a vertical position, in combination with sprockets $c$ and $d$, cam F, and forwardly-inclined frame, substantially as shown and described.

JOHN T. JOHNSON.

Witnesses:
LLEWELLYN H. BOSWELL,
JAMES S. DICKERSON.